3,205,215
METHOD OF TERMINATING BUTADIENE POLYMERIZATION WITH ORGANIC SULFIDES TO REDUCE COLD FLOW IN POLYBUTADIENE
Henry L. Hsieh, Bartlesville, Okla., assignor to Phillips Petroleum Company, a corporation of Delaware
No Drawing. Filed Aug. 6, 1962, Ser. No. 214,863
13 Claims. (Cl. 260—94.3)

This invention relates to catalyst-inactivating agents and their use in the termination of the polymerization of 1,3-butadiene. In another aspect, it relates to a method of reducing the tendency of polybutadiene to cold flow by the utilization of certain catalyst-inactivating agents. Still another aspect, the invention relates to the improved polybutadiene obtained when using the method of shortstopping the polymerization.

There has been conducted in recent years a great deal of research work directed toward the production of improved rubbery polymers. Great advances have been recently made in this field as a result of the discovery of new catalyst systems. These catalyst systems are often described as being "stereospecific" since they are capable of polymerizing monomers, particularly conjugated dienes, to a certain geometric configuration. One of the products which has attracted widespread attention because of its outstanding and superior properties is a polybutadiene containing a high percentage, e.g., at least 85 percent, of cis-1,4-addition. The physical properties of this high cispolybutadiene are of such a nature that the polymer is particularly suitable for the fabrication of heavy duty tires and other articles for which conventional synthetic rubbers have heretofore been comparatively unsatisfactory. However, in the processing of high cis-polybutadiene, particularly in its packaging, shipping and storage, a certain amount of difficulty has been encountered because of the tendency of the polymer to cold flow when in the unvulcanized state. For example, if cracks or punctures develop in the package used in storing the polymer, the polymer will flow from the package with a resulting product loss or contamination and sticking together of stacked packages.

It is an object of this invention, therefore, to provide a method for terminating the polymerization reaction in which polybutadiene is produced so as to obtain a polymer product which has a reduced tendency to cold flow.

Another object of the invention is to provide a novel composition containing cis-polybutadiene which has a reduced tendency to cold flow when in the unvulcanized state.

A further object of the invention is to provide a method for inactivating a catalyst comprising an organometal compound and an iodine-containing component, which is employed in the polymerization of 1,3-butadiene.

Other and further objects and advantages of the invention will become apparent to those skilled in the art upon consideration of the accompanying disclosure.

The present invention is concerned with a method for inactivating the organometal-type catalyst employed in the polymerization of 1,3-butadiene. It has been discovered that the problem of cold flow in cis-polybutadiene can be substantially reduced by shortstopping the polymerization reaction with an organic sulfide selected from the group consisting of organic mono- and polysulfides. Rubbery polymers of cis-polybutadiene having Mooney values in the range of about 10 to 60 (ML–4 at 212° F.) can be readily obtained according to this method without serious problems in handling and processing.

When polymerizing 1,3-butadiene with an organometal-type catalyst, the reaction is usually terminated or shortstopped when the conversion has reached the desired level by the addition to the polymerization mixture of a catalyst-inactivating agent. Compounds which have been used to inactivate the catalyst include materials such as water, alcohols and rosin acids. These materials are effective shortstopping agents, but the product produced often has a tendency to cold flow when in the unvulcanized state. Accordingly, it was completely unexpected when it was found that the organic sulfides of this invention in addition to being effective shortstopping agents functioned to reduce the tendency of the polymer to cold flow. Furthermore, the valuable properties characteristic of cis-polybutadiene vulcanizates are retained by proceeding according to the present invention.

The shortstopping agents of this invention can be conveniently represented by the formula R—$S_x$—R', wherein R and R' are individually selected from the group consisting of aliphatic, cycloaliphatic and aromatic radicals, and $x$ is an integer from 1 to 5, inclusive. It is to be understood that the R and R' radicals may be alike or different. Each of the radicals preferably contains from 1 to 20 carbon atoms. The polysulfides employed in the process can be individual components, or mixtures of polysulfides, e.g., mixtures of disulfides with higher sulfides such as tri-, tetra- and pentasulfides, can be used. It is also within the scope of the invention to utilize mixtures of monosulfides with polysulfides.

Specific examples of organic mono- and polysulfides include dimethyl sulfide, methyl ethyl sulfide, di-tert-butyl sulfide, n-propyl cyclohexyl sulfide, diphenyl sulfide, phenyl 1-naphthyl sulfide, benzyl 4-methylcyclohexyl sulfide, didodecyl sulfide, hexyl eicosyl sulfide, n-propyl n-heptyl disulfide, di-n-pentyl trisulfide, ethyl 4-tolyl tetrasulfide, di-4-phenylcyclohexyl tetrasulfide, diethyl pentasulfide, dimethyl tetrasulfide, n-butyl phenyl tetrasulfide, di-2-naphthyl trisulfide, methyl pentadecyl pentasulfide, and the like.

The shortstopping agents of this invention are broadly applicable to polymerization processes in which butadiene is polymerized with organometal-type catalysts. In a preferred embodiment, the organic sulfides are added to the polymerization mixture obtained by polymerizing butadiene with a catalyst system which includes an organometal compound and iodine, present either in the free or combined state. This polymerization system produces a cis-polybutadiene having outstanding properties when in the cured state but having a tendency to cold flow in the unvulcanized state. The term "cis-polybutadiene" as used herein, is intended to include a polybutadiene containing at least 85 percent cis 1,4-addition, e.g., from 85 to 98 percent or higher. These high cis-polybutadienes can be prepared by polymerizing 1,3-butadiene with any one of a large number of different stereospecific catalyst systems.

The shortstopping agents of this invention are preferably utilized to terminate the polymerization reaction in which 1,3-butadiene is polymerized with a catalyst selected from the group consisting of (1) a catalyst comprising an organometal compound having the formula $R_mM$, wherein R is an alkyl, cycloalkyl, aryl, alkaryl, aralkyl, alkylcycloalkyl or cycloalkylalkyl radical, M is aluminum, mercury, zinc, beryllium, cadmium, magnesium, sodium or potassium, and $m$ is equal to the valence of the metal M, and titanium tetraiodide, (2) a catalyst comprising an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3) a catalyst comprising an organometal compound having the formula $R_aM''$, wherein R is an organo radical as defined above, M'' is aluminum or magnesium and $a$ is equal to the valence of the metal M″, a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, M‴ is aluminum, gallium, indium or thallium, and $x$ is equal to the valence of the metal M‴, a titanium halide having the formula $TiX_4$, wherein X is chlorine or bromine, and an inorganic halide having the formula $M^{iv}I_c$, wherein $M^{iv}$ is beryllium, zinc, cadium, aluminum, gallium, indium, thallium, silicon, germanium, tin, lead, phosphorus, antimony, arsenic, and bismuth, and $c$ is an integer from 2 to 5, inclusive, and (5) a catalyst comprising an organo compound having the formula $R_xM'''$, wherein R, M‴ and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5 inclusive. The R radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide, triethylaluminum, titanium tetrachloride, and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodine and tin tetrachloride; triisobutylaluminum, titanium tetraiodide and antimony trichloride, triisobutylaluminum, titanium tetraiodide and aluminum trichloride; triisobutylaluminum, titanium tetraiodine, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene product can vary over a rather wide range. The amount of the organometal used in the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mole ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing this cis-polybutadiene. These materials include carbon dioxide, oxygen and water. It is usually desirable, therefore, that the butadiene and diluent be free of these materials as well as other materials which may tend to inactivate the catalyst. Furthermore, it is desirable to remove air and moisture from the reaction vessel in which the polymerization is to be conducted.

Upon completion of the polymerization reaction, the reaction mixture is then treated to inactivate the catalyst and recover the rubbery polymer. In accordance with the present invention, the catalyst is inactivated by adding to the reaction mixture an organic sulfide. The amount of this shortstopping agent employed is usually in the range of 0.1 to 1 part by weight per 100 parts by weight of rubber. It is generally preferred to use an amount in the range of 0.15 to 0.70 part by weight per 100 parts by weight of rubber. After the shortstopping agent has been added, the polymer is then recovered by conventional methods such as steam stripping, alcohol coagulation or the like.

A more comprehensive understanding of the invention can be obtained by referring to the following illustrative examples, which are not intended, however, to be unduly limitative of the invention.

EXAMPLE I

Diphenyl disulfide was used as a shortstopping agent in a run in which butadiene was polymerized with a catalyst consisting of triisobutylaluminum, titanium tetrachloride and elemental iodine. A control run was also conducted in which a similar reaction was shortstopped with isopropyl alcohol. The polybutadiene product obtained in each of the runs contained about 95 percent cis 1,4-addition. The following recipe was employed in the polymerizations:

*Recipe*

| | |
|---|---:|
| 1,3-butadiene, parts by weight | 100 |
| Toluene, parts by weight | 1100 |
| Triisobutylaluminum, mhm.[1] | 2.3 |
| Iodine, mhm.[1] | 0.68 |
| Titanium tetrachloride | 0.39 |
| Temperature, °F. | 41 |
| Time, hours | 16 |
| Conversion, percent | 100 |

[1] Millimoles per 100 parts monomer.

In conducting the runs, toluene was charged first to the reactor after which it was purged with nitrogen. Butadiene was then added, followed by the triisobutylaluminum, elemental iodine and titanium tetrachloride in the order named. The run according to the invention was shortstopped with 0.2 part by weight per 100 parts of rubber of diphenyl disulfide. In the control run, the reaction was shortstopped with isopropyl alcohol. After shortstopping, the polymers were coagulated with isopropyl alcohol and separated. Thereafter, 0.5 part by weight per 100 parts of rubber of the antioxidant 2,2'-methylene-bis(4-methyl-6-tert-butylphenol) was incorporated into the wet polymer. The products were then dried. The results of the runs are shown hereinafter in Table I.

TABLE I

| | Shortstopping Agents | |
|---|---|---|
| | Diphenyl Disulfide | Isopropyl Alcohol |
| Mooney, ML-4 at 212° F.[1] | 41 | 40.2 |
| Inherent viscosity [2] | 2.33 | 2.31 |
| Cold flow, mg./min.[3] | 2.2 | 4.0 |

[1] ASTM D-297-55T.
[2] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[3] Cold flow was measured by extruding the rubber through a ¼-inch orifice at 3.5 p.s.i. pressure and a temperature of 50° C. (122° F.). After allowing 10 minutes to reach steady state, the rate of extrusion was measured and the values reported in milligrams per minute.

The data in Table I demonstrate that a substantial reduction in cold flow is obtained by using the organic sulfide shortstopping agent of this invention.

EXAMPLE II

Two runs were carried out in which the same recipe shown in Example I was employed. In the run carried out according to the present invention, 0.2 part by weight per 100 parts of rubber of tertiary octyl polysulfide was used as the shortstopping agent. Isopropyl alcohol was employed in the control run as the shortstopping agent. The procedures followed in the polymerizations and in the recovery of the products were the same as described in Example I. The results of the runs are shown below in Table II.

TABLE II

| | Shortstopping Agents | |
|---|---|---|
| | Tertiary Octyl [1] Polysulfide | Isopropyl Alcohol |
| Mooney, ML-4 at 212° F.[2] | 43.0 | 38.8 |
| Cold flow, mg./min.[2] | 2.6 | 4.7 |

[1] Mixture of tri-, tetra-, and pentasulfides.
[2] See footnotes to Table I.

The data in the above table show that when tertiary octyl polysufide is employed as a shortstopping agent in a cis-polybutadiene polymerization system, the product has a much lower cold flow than isopropyl alcohol when used to shortstop the reaction.

As will be evident to those skilled in the art, many variations and modifications of the invention can be practiced in view of the foregoing disclosure. Such variations and modifications are believed to come within the spirit and scope of the invention.

I claim:

1. In a process for polymerizing 1,3-butadiene in the presence of an iodine-containing catalyst system which forms on mixing components comprising an organometal and a titanium halide, the improvement which comprises adding to the polymerization mixture as a shortstopping agent an organic sulfide having the formula R—$S_x$—R', wherein R and R' are individually selected from the group consisting of aliphatic, cycloaliphatic and aromatic radicals, and $x$ is an integer from 1 to 5, inclusive.

2. In a polymerization process in which 1,3-butadiene is polymerized with an iodine-containing catalyst formed from components which include an organometal and a titanium halide, the improvement which comprises shortstopping the polymerization by adding to the polymerization mixture an organic sulfide having the formula R—$S_x$—R', wherein R and R' are individually selected from the group consisting of aliphatic, cycloaliphatic and aromatic radicals, and $x$ is an integer from 1 to 5, inclusive, the amount of said organic sulfide being in the range of 0.1 to 1 part by weight per 100 parts by weight of polymer.

3. The process of claim 2 in which said organic sulfide is diphenyl disulfide.

4. The process of claim 2 in which said organic sulfide is tertiary octyl polysulfide.

5. The process of claim 2 in which said organic sulfide is dimethyl sulfide.

6. The process of claim 2 in which said organic sulfide is di-tert-butyl sulfide.

7. The process of claim 2 in which said organic sulfide is methyl ethyl sulfide.

8. The process for producing a cis-polybutadiene which comprises shortstopping the polymerization of 1,3-butadiene in the presence of an iodine-containing catalyst system formed from components including an organometal and titanium halide by adding to the polymerization mixture an organic sulfide having the formula R—$S_x$—R', wherein R and R' are individually selected from the group consisting of aliphatic, cycloaliphatic and aromatic radicals, and $x$ is an integer from 1 to 5, inclusive, the amount of said organic sulfide being in the range of 0.15 to 0.70 part by weight per 100 parts by weight of cis-polybutadiene; and recovering said cis-polybutadiene from said polymerization mixture.

9. The process of claim 8 in which said catalyst system comprises the product obtained by mixing a trialkylaluminum, titanium tetrachloride and iodine.

10. The process of claim 8 in which said catalyst system comprises the product obtained by mixing a trialkylaluminum and titanium tetraiodide.

11. The process of claim 8 in which said catalyst system comprises the product obtained by mixing a trialkylaluminum, titanium tetrachloride and titanium tetraiodide.

12. A process for producing cis-polybutadiene which comprises shortstopping the polymerization of 1,3-butadiene in the presence of a catalyst system formed by mixing triisobutylaluminum, titanium tetrachloride and iodine by adding diphenyl disulfide to the polymerization mixture in an amount in the range of 0.15 to 0.70 part by weight per 100 parts of polybutadiene, and recovering the cis-polybutadiene from the polymerization mixture.

13. A process for producing cis-polybutadiene which comprises shortstopping the polymerization of 1,3-butadiene in the presence of a catalyst system formed by mixing triisobutylaluminum, titanium tetrachloride and iodine by adding tertiary octyl polysulfide to the polymerization mixture in an amount in the range of 0.15 to 0.70 part by weight per 100 parts of polybutadiene, and recovering the cis-polybutadiene from the polymerization mixture.

References Cited by the Examiner

UNITED STATES PATENTS

| | | | |
|---|---|---|---|
| 2,996,459 | 8/61 | Andersen et al. | 260—94.9 |
| 3,076,795 | 2/63 | Hall | 260—94.7 |

JOSEPH L. SCHOFER, *Primary Examiner.*